US007653550B2

(12) United States Patent
Schulz

(10) Patent No.: US 7,653,550 B2
(45) Date of Patent: Jan. 26, 2010

(54) INTERFACE FOR PROVIDING MODELESS TIMELINE BASED SELECTION OF AN AUDIO OR VIDEO FILE

(75) Inventor: Egan Schulz, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 717 days.

(21) Appl. No.: 10/816,121

(22) Filed: Apr. 1, 2004

(65) Prior Publication Data

US 2004/0199395 A1 Oct. 7, 2004

Related U.S. Application Data

(60) Provisional application No. 60/460,338, filed on Apr. 4, 2003.

(51) Int. Cl.
*G10L 21/00* (2006.01)
*G06F 3/16* (2006.01)
(52) U.S. Cl. .................. 704/278; 715/727; 715/728
(58) Field of Classification Search ............. 704/278; 715/716, 727
See application file for complete search history.

(56) References Cited

U.S. PATENT DOCUMENTS 5,204,969 A * 4/1993 Capps et al. ............. 704/278
5,781,188 A * 7/1998 Amiot et al. ............. 715/723
5,792,971 A * 8/1998 Timis et al. ............... 84/609
6,365,817 B1 * 4/2002 Suzuki et al. ............. 84/603
7,062,713 B2 * 6/2006 Schriever et al. ......... 715/723

OTHER PUBLICATIONS

Digidesign, "Pro Tools Reference Guide", Version 5.3, Avid Technologies, Inc., 2002.*
Reason'Version 2.0 Operation Manual, Propellerhead Software, 2002.*
Sony Sound Forge 6.0 Users Manual, 2002. http://www.sonycreativesoftware.com/dl/dl.aspx?dwnid=94.*

* cited by examiner

*Primary Examiner*—Richemond Dorvil
*Assistant Examiner*—Douglas C Godbold
(74) *Attorney, Agent, or Firm*—Hickman Palermo Truong & Becker LLP; Adam C. Stone

(57) ABSTRACT

A timeline-based approach for selecting and manipulating audio tracks is presented. This is accomplished via a graphical user interface that provides users with a series of visual cues and enhancements when selecting a particular area of an audio track depicted within the interface. These visual cues are rendered as a display region having multiple other display areas, components or interface components that provide the user with a location for initiating actions upon the file. User input provided to the timeline component generates a selection overlay that indicates a selected area of the audio file. The user can perform numerous actions with that audio file, such as copying and pasting. The user can do this more quickly and efficiently because the user is not required to switch tools. Everything is accomplished "modelessly." Multiple instances of the selection overlay applied, for example, across multiple audio tracks may achieve even more powerful results.

22 Claims, 7 Drawing Sheets

Prior Art Graphical User Interface FIG. 1

Prior Art Graphical User Interface FIG. 2

INTERFACE FOR PROVIDING MODELESS TIMELINE BASED SELECTION OF AN AUDIO OR VIDEO FILE

CROSS REFERENCE TO RELATED APPLICATIONS

This application claims priority from U.S. Provisional Application No. 60/460,338 filed on Apr. 4, 2003, the specification of which is herein incorporated by reference.

BACKGROUND OF THE INVENTION

1. Field of the Invention

The invention relates to the field of computer software. More specifically the invention is directed to a Graphical User Interface (GUI) for selecting and manipulating audio or video data.

2. Background Art

Computer software programs are most frequently designed to provide users with the ability to perform a set of distinct functions. Some of these distinct functions require a set of input parameters. In many, but not all cases, computer users provide this input via an input device such as a keyboard, mouse, or touch screen. Most software programs display a set of graphical components that provide visual cues to the user. These visual cues are designed to hint at or directly display inputs required from the user. This set of graphical components is referred to by those of ordinary skill in the art as a Graphical User Interface (GUI). Many different software programs utilize GUIs. Some of these programs utilize GUIs for purposes of assisting the user with manipulating audio data. For example, software programs exist that enable users to create songs and other audio files by seamlessly combining a set of pre-recorded audio files.

An example of a prior art program that has such functionality is called ACID™ (distributed by Sound Foundry™, Incorporated). Users of ACID™ and other sound editing programs have a need to select and possibly duplicate or delete segments of one or more of the audio files. A user making a remix of a song may, for example, wish to make the song longer and repeat or distort parts of the song by duplicating only a segment of a certain audio track. Existing interfaces for selecting segments of an audio file and duplicating or deleting the selected segment are limited in that such interfaces do not have a set of components to adequately assist the user with the process of accurately selecting a particular segment of the audio file.

Most prior art systems use a system known in the art as modal tool for selection and editing of audio files. Modal Tools require a user to click on a Toolbar that is representative of the tools available in the program to initiate the use of the tool. This requires a few steps for the user. For instance, the user must stop the progress of whatever they were just doing; move the pointer (e.g. mouse) to the tool selection area; and select the desired tool, for example, a selection tool. (Alternatively an experienced user could turn the desired tool on by clicking the appropriate keyboard shortcut.) The user must now come back to the Timeline interface and make the desired selection.

FIG. 1 is an illustration of a prior art GUI and the process of graphically editing objects. This workflow is evident in numerous prior art products, e.g., Apple Computers' Final Cut Pro and Final Cut Express both have the same work flow. As illustrated in FIG. 1, GUI 100, objects 102, 104, and 106 are audio entities in timeline area 130 which the user desires to manipulate. Object 101 is the pointer, which is located somewhere on the GUI, for example, area 120; and object 110 is the tool selection area. As illustrated, tool selection area 110 comprises selection tool 111, magnifier 112, crop tool 113, pen tool 114, etc.

FIG. 2 is an illustration of the prior art selection process. As illustrated, a user desiring to use the selection tool moves mouse pointer 101 to tool selection area 110. The user then clicks (or selects) the desired tool in the tool selection area, for example, selection tool 111.

After obtaining the desired tool from tool selection area 110, the user moves the mouse pointer 101 back to timeline interface area 130 to do the desired action, e.g., selection of audio section.

U.S. Pat. No. 5,204,969 entitled "Sound Editing System Using Visually Displayed Control Line for Altering Specified Characteristic of Adjacent Segment of a Waveform", filed on Mar. 19th, 1992 and assigned to Macromedia, Incorporated (hereinafter the '969 patent) is an example of a prior art technique for editing audio files.

The system described in the '969 patent provides a means for entering and storing sound waveforms in a computer memory, for visually displaying the waveform on a computer screen, and for altering the stored waveform by making changes in the appearance of the waveform on the screen, which changes are translated by the computer into changes in the stored waveform. The '969 system includes means for simultaneously displaying several sound waveforms on the screen for purposes of mixing them (i.e., combining several sound waveforms into one) by moving their locations on the screen so as to synchronize selected parts of the waveforms in time. Also, the system provides a means to alter the pitch (i.e., frequency) or amplitude of a particular part of any waveform by moving a segment of a line adjacent to the waveform on the screen. The line corresponds to the pitch or amplitude for the adjacent part of the waveform. Although the interface described in the '969 patent does provide the user with some useful visual cues and the ability to perform important functions, the interface does not utilize a set of components that enables the user to utilize a timeline based approach to precisely select areas of an audio file and the files adjusted parameters.

Because of the limitations existent in the prior art and for other reasons not stated herein, there is a need for an improved interface for handling the editing of audio files.

SUMMARY OF THE INVENTION

Embodiments of the invention improve upon current technologies by providing users with a timeline-based approach for selecting audio data, video data, or any other data that is played back over time, generating a selection overlay and performing one or more special functions on the selected data and its corresponding set of parameters. This is accomplished via a graphical user interface configured to provide users with a series of visual cues and enhancements that assist the user with the process of selecting a particular area of the audio track depicted within the interface.

These visual cues are rendered within the interface in the form of a display region having multiple other display regions, areas or interface components configured to provide the user with a location for initiating one or more actions upon the audio file associated with the interface. For instance, a display region configured in accordance with an embodiment of the invention comprises an audio source region for use during the process of authoring music by using a series of prerecorded audio files obtained from the audio source region. The audio source region contains a list of audio files available to the user for the user's intended purpose. When the user selects one of the audio files from the audio source region and places that audio file into a region of the interface, the system generates an audio display region that comprises a timeline component, waveform component and zero or more parameter components.

Each audio display region is associated with one or more audio files and has one or more graphical components configured to visually represent an audio file and provide a mechanism for initiating one or more special functions. To create music, users of the system arrange a set of one or more of the generated audio display regions along a timeline in sequence of playback. To change the sequence of audio files users can rearrange the sequence of each audio display region. Some of the audio files depicted within the interface overlap the same timeline axis. Such an overlap with respect to time indicates that when the audio files are played the system will play the overlapping files simultaneously. To sequence playback of the audio files users can arrange the files in the audio display region in chronological order.

The audio display region configured in accordance with an embodiment of the invention contains a set of interface components. These interface components visually depict the characteristics and/or parameters of the audio content when playback occurs over time. Some examples of the additional types of interface components associated with the timeline component include a waveform component and a set of zero or more optionally viewable parameter components. The waveform components of the audio display region each depict the amplitude characteristics of an associated audio file. By viewing a waveform component users can quickly discern the audio characteristics of the associated file. The parameter components provide a mechanism for a user to view and adjust the parameters of an audio file. Each of these interface components may be associated with a timeline component. The timeline component depicts the duration of the audio file and can perform one or more special functions when selected by the user. In one embodiment of the invention the timeline component sits adjacent to or is otherwise visually associated with the waveform component.

By utilizing an input device (e.g., a keyboard, mouse, touch screen, etc.) to select a first and second point within the timeline component, users can initiate one or more special functions. One example of a special function the timeline component is capable of initiating is called a select function. The select function receives as input an area of the audio file to be selected and generates a selection overlay that visually highlights the selected area of the display components representing the audio file (e.g., the waveform component and/or the parameter components). In one implementation the selection overlay may partially obscure or highlight the waveform component and any visible parameter components associated with the area of the audio file selected via the timeline component. The selection overlay provides users with a mechanism for visually distinguishing the area of the audio file selected when the user interacts with the timeline component.

Other special functions associated with the timeline component include a copy or move function that enables users to duplicate or move a selected area of the audio file (e.g., the area associated with the selection overlay). For instance, the user can initiate a move command and thereby cause the system to move the audio data associated with the selection overlay from one part of the interface to another part of the interface. Other functions include a cut command that deletes the area of the audio file associated with the selection overlay and a copy operation that duplicates the selected area elsewhere in the interface. The user may also initiate special functions (e.g., duplicating the audio file and the corresponding set of parameters) by dragging the area of the waveform having an associated selection overlay from one region of the interface to another. When a duplicate or move function is initiated the system generates a new instance of the audio file based on the selection overlay. The new instance comprises a duplicate set of the data that falls within the bounds of the selection overlay. However, in instances where a move operation occurs the system may use the original data rather than create a duplicate.

The interface also has functions that enable users to cause the system to modify the characteristics and/or parameters of an audio file at certain points during playback. The ability to adjust parameters is applicable to the original audio file and new instances of the audio file. In one embodiment of the invention, parameters associated with the audio data as well as any adjustments made to those parameters via the parameter component are copied along with the audio data. For instance, when an audio file has an underlying volume, EQ properties, bass, balance, pan, etc., these parameters are duplicated or moved along with the area of the audio file that is duplicated or moved. The user can adjust parameters associated with the original audio data or the new instance using the parameter adjustment line of the parameter component. These parameter components provide an effective way for users to visually determine the characteristics of a parameter and intuitively adjust those characteristics. Such adjustments are made via a parameter adjustment line or some other shape embedded within each of the parameter components in a way that indicates the nature of the adjustments the user can make. For instance, the parameter adjustment line may appear horizontal to indicate that the characteristics of the parameter remain unchanged throughout the duration of playback. The user can make adjustments to this parameter by selecting and then displacing an area of the parameter adjustment line associated with the point in time (shown on the timeline component) where an adjustment is desired. If, for example, the user wanted to adjust the volume parameter so that at a certain point during playback the volume of the audio file decreased, the user would select the point at which the decrease in volume was desired and move the parameter adjustment line in a direction indicative of the adjustment made (e.g., up for an increase/down for a decrease). Other parameters, such as pan, balance, EQ, bass, treble, or any other adjustable characteristics of the audio file can be adjusted using the parameter adjustment line. Each parameter typically has its own dedicated parameter component, but more than one parameter adjustment line can reside within each parameter component.

When a selection is made, the appropriate areas of adjusted parameters are included in the selection overlay and copied along with the audio file itself. Thus, embodiments of the invention provide a timeline-based approach for selecting and manipulating one or more areas of an audio track and a set of corresponding parameters. In some embodiments, multiple instances of the selection overlay may be used in combination across one or more audio tracks, either in continuous or discontinuous selections, to achieve more complex end results in an efficient manner. The interface and the functionality associated with certain components of that interface will now be described in further detail.

DETAILED DESCRIPTION OF THE INVENTION

A Graphical User Interface (hereinafter the interface) configured to assist users with the process of selecting an area of audio data and performing one or more special functions on the selected area is described. Although the examples herein relate to audio data, the invention is also applicable to video data or any other data played back over time. Thus, the invention is not limited solely to audio data.

In the following description numerous specific details are set forth in order to provide a more thorough understanding of embodiments of the invention. In some instances, well-known features have not been described in detail so as not to obscure embodiments of the invention. It will be apparent, however, to an artisan of ordinary skill, that it is possible to practice the present invention without these specific details or by using equivalents or alternatives to the specific examples given. As such, this detailed description of preferred and alternative embodiments should not be construed to limit the scope or breadth of the present invention. The claims and the full scope of any equivalents are what define the metes and bounds of the invention.

A. Overview

The interface implementing one or more aspects of the invention enables users to create songs, remix audio tracks, produce surround sound audio mixes, create music for web sites or other mediums, score a video, and/or create a combination of sounds for some other purpose. To accomplish these and other functions not specifically addressed herein, the interface makes use of a number of audio display regions. Each audio display region is associated with at least one audio file and includes components that provide users with a mechanism for applying one or more special functions. Some examples of the type of components the audio display region may contain include a timeline component, a waveform component, and zero or more parameter components. Actions performed on the timeline component cause the system to generate a selection overlay that highlights the areas of the audio display region where users can initiate further functions. This highlighted area typically relates to the timeline component itself and the waveform component, but may optionally contain one or more parameter adjustment components associated with the underlying audio file. In some, but not all instances, the selection overlay is used to identify what portions of the waveform component (and hence what segment of the audio file the waveform represents) the user wishes to manipulate via the special functions implemented by the system. In some (but not all) instances, these selections include the "blank" space (i.e., silence) in between multiple audio files, which is also affected by the use of the invention.

B. Components of the Audio Display Region

Figure 1:
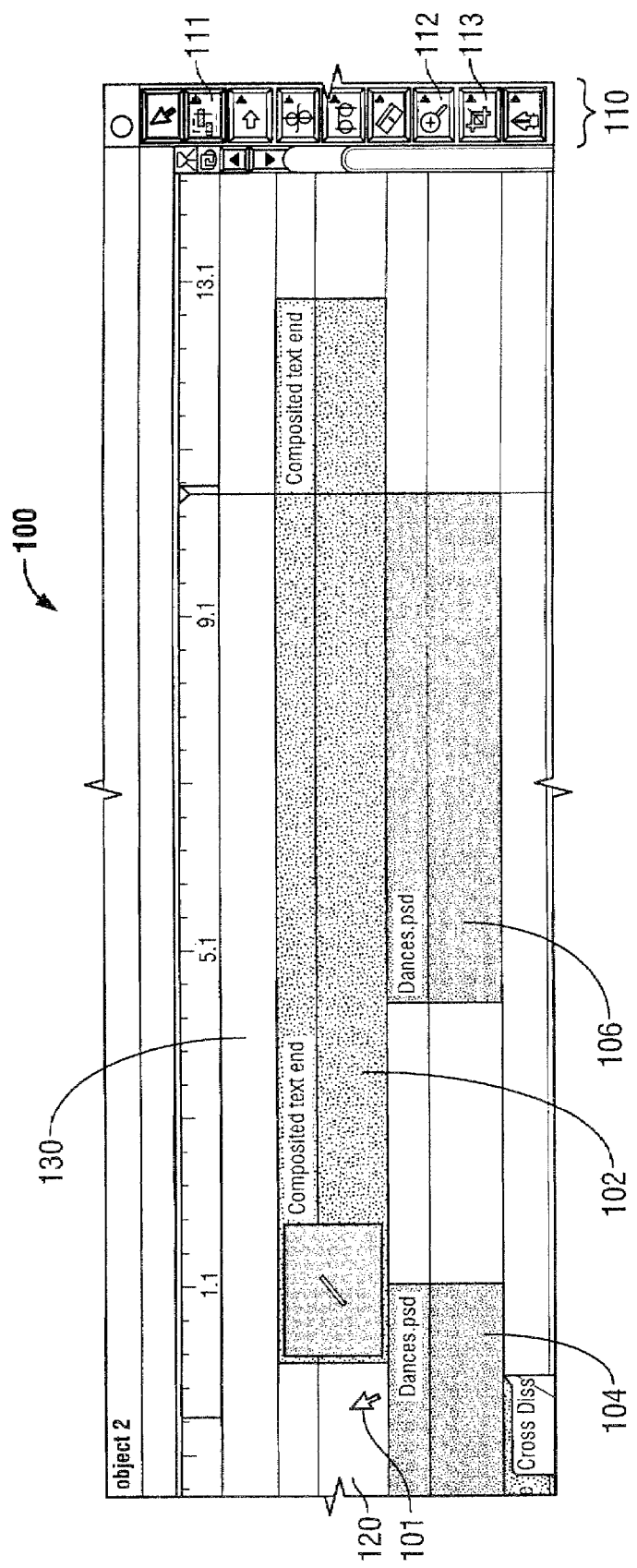
FIG. 1 is an illustration of a prior art interface component for audio manipulation.
Figure 2:
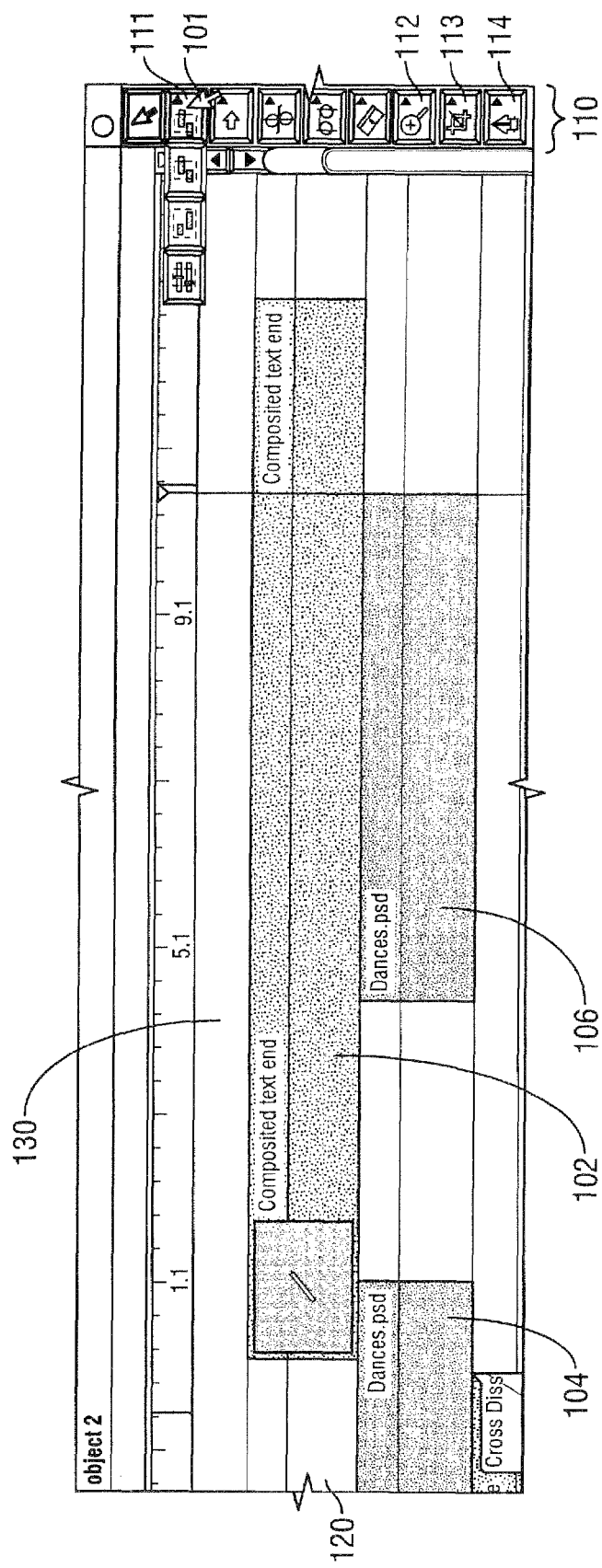
FIG. 2 is an illustration of steps used in prior art interface components for audio manipulation.
Figure 3:
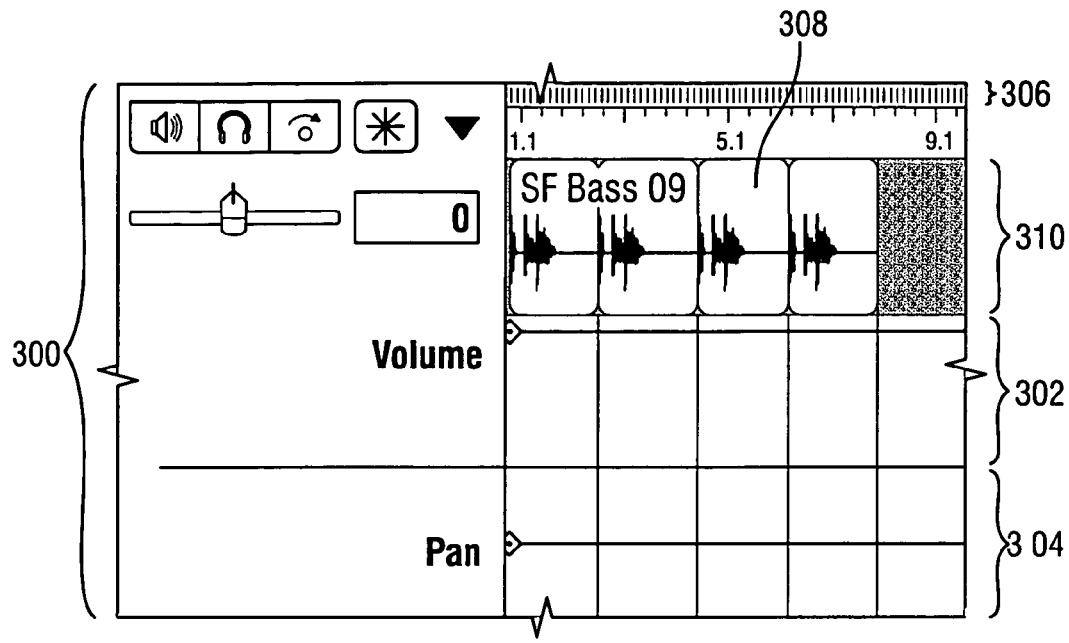
FIG. 3 is an illustration of a graphical user interface for manipulation of audio files in accordance with an embodiment of the present invention.

FIG. 3 illustrates a component of the interface referred to as an audio display region. The user generates audio display region 300 by selecting an audio source file from elsewhere in the interface and dragging the audio source file into an editing region. It should be noted that although this specific illustration is described as being contained within an editing region, use of the invention may occur within any type of interface. Thus, the invention includes, but is not limited to use within an editing region. In either case audio display region 300 is associated with one or more audio files and contains a set of interface components configured to visually represent aspects of those underlying audio file(s). For instance, audio display region 300 is associated with an audio file 308 referred to as "SF Bass 09" and contains a timeline component 306, a waveform component 310 and parameter components 302 and 304. The purpose and functionality of each of the components associated with display region 300 will be discussed in further detail below.

1. Timeline and Waveform Components

Audio display region 300 comprises timeline component 306. In one embodiment of the invention timeline component 306 depicts a timeline configured to have a visual and functional association with waveform component 310 and the actual audio file which waveform component 310 represents. Waveform component 310 contains a visual representation of the amplitude characteristics of the audio file associated with display region 300 when that file is played over a period of time. The reader should note that although FIG. 3 depicts timeline component 306 adjacent to waveform component 310, it is contemplated as being within the scope of the invention for the system to render other display components between waveform component 310 and timeline component 306, or in place of the waveform component 310.

In one or more embodiments of the invention, timeline component 306 comprises elements that visually represent a set of time markers or delimiters. These time markers are typically indicative of a set time interval (e.g., 1 second), but can also represent a variable set of time points. If, for example, an audio file is ten seconds, timeline component 306 may depict one hundred time markers where each time marker represents a portion of the total playback period (e.g., ten time markers per second of playback).

When the user provides input to timeline component 306, the system is designed to execute a set of special functions. Functions and the other visual effects associated with input to timeline component 306 are discussed in further detail with respect to FIG. 5.

2. Parameter Components/Parameter Adjustment Elements

Each audio file depicted within audio display region 300 is associated with a set of optionally displayed parameter components. FIG. 3 shows an example of an unadjusted set of parameter components, "Volume" and "Pan" (e.g. distribution). The interface uses these parameter components as a mechanism for visually representing the various adjustable aspects of the audio file associated with audio display region 300. In the example illustrated in FIG. 3, parameter component 302 relates to the volume of the audio file associated with display region 300. Parameter component 304 illustrates the pan level associated with the same audio file.

Audio display region 300 is configured in one embodiment of the invention to enable the user to optionally display additional parameter components for purposes of viewing one or more states associated with any definable aspect of an audio file. However, the system is not required to display every adjustable audio file parameter and in some instances the parameter components may remain hidden and may be revealed when the user issues a specific request. Thus, display region 300 may contain zero or more parameter components each of which the user can add or subtract upon command.

One instance of the interface implementing one or more aspects of the invention is configured to render one or more parameter adjustment elements within each of the parameter components. Each parameter adjustment element provides users with an interface component for manipulating one or more parameters of the audio file associated with display region 300. The parameter adjustment elements are referred to in one embodiment of the invention as a parameter adjustment line. Note that although the parameter adjustment elements are referred to herein as parameter adjustment lines, other visual adjustment mechanisms may be used. For instance, the parameter adjustment element may comprise of discrete sliders for each time point or time slice (or segment).

When the user selects a point on a parameter adjustment line and displaces that point from one location in the display region to another, the system adjusts one or more of the audio file parameters associated with the modified parameter in a manner that coincides with the displacement. By displacing the parameter adjustment line associated with a period of playback, users can effectuate changes to an identifiable point of the audio file. Thus changes may occur to one part of the audio file (e.g., the first second) when no changes are made to the second part of the audio file.

Figure 4:
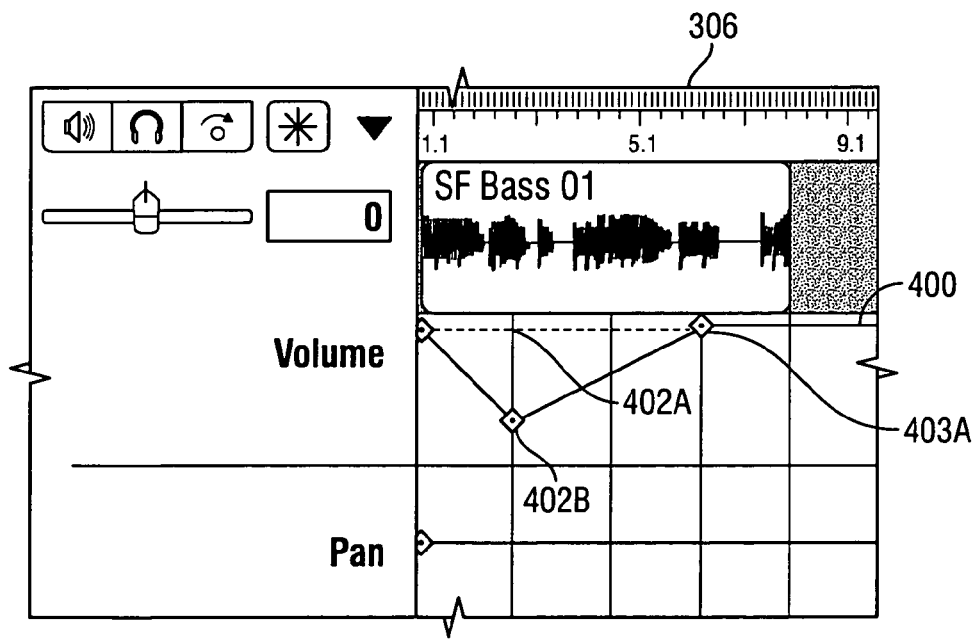
FIG. 4 is an illustration of a graphical user interface indicating the audio file and one or more its adjustable parameters in accordance with an embodiment of the present invention.

FIG. 4 illustrates the use of parameter adjustment lines to manipulate an audio file. The purpose behind each parameter adjustment line is to provide users with an intuitive mechanism for manipulating the characteristics of one or more parameters at an identified segment of the audio file. If, for instance, a user wanted to adjust the volume of the audio file associated with parameter adjustment line 400 the user could achieve this effect by using an input device to select point 402A on the parameter adjustment line. The user may then move point 402A of the parameter adjustment line to point 402B, for example. This action causes the system to decrease the volume during playback at a time associated with point 402B and then increase the volume back up to a certain level when playback reaches point 403A. Also, an embodiment of the invention may be configured such that an upward movement of the parameter adjustment line 400 increases the volume of the associated audio file. Thus, the volume may be decreased by a downward adjustment of the parameter adjustment line and increased by an upward adjustment of the parameter adjustment line.

Therefore, it is feasible to configure interfaces embodying the invention to respond to adjustments made in any direction. For example, selecting a point on the parameter adjustment line and dragging the selected point in a direction that displaces the line from its original position causes adjustments to be made to the audio file associated with the parameter adjustment line. Thus, the parameter adjustment line enables the user to adjust the parameters of the audio file at any point during playback. It should be noted that although the description herein uses lines as the geographic shape used to make adjustments, the audio display region or other parts of the interface may implement the same functionality using any type of graphic element that represents the parameters of an audio file as it is played back over time.

In the example of FIG. 4, each audio display region is configured so that zero or more parameter adjustment lines are associated with each audio file and any adjustments made to these parameter adjustment lines relate to the point in time indicated on the timeline component associated with the audio file. For instance, the volume parameter is at its lowest point when playback crosses time equivalent to point 402B of timeline component 306. Thus, adjustments made at point 402B have the most significant effect on the audio file during the playback that occurs between points 402B and 403A. However, if the user were to move point 403A above or below its original position changes may also occur between point 403A and the right-end of parameter adjustment line 400.

C. Initiating Special Functions Via the Timeline Component

One embodiment of the invention allows users to initiate one or more special functions via timeline component 306. One example of a special function the timeline component is capable of initiating is referred to generally as a select function. The select function receives as input to the timeline component a beginning and end time that identifies the portion of the audio file to be selected and generates a selection overlay that visually highlights the identified area. In some instances, the selection overlay highlights the timeline component itself, the waveform component and any parameter components the user opted to make visible. For instance, when a user selects a set of time points on timeline component 306, the system generates the selection overlay that highlights the regions of the timeline component 306, waveform component and parameter components identified by the user's selection.

Each of the time points depicted on timeline component 306 is indicative of a fixed interval of time. Thus, the user can determine an approximate begin and end time by glancing at the timeline. The timeline component, however, is not required to contain a set of time points having fixed intervals and the system may render the timeline with variable intervals or with no intervals. In one embodiment of the invention, the time associated with a point on timeline component 306 is visually depicted within the interface when the user selects or moves an input device over a part of the timeline. The user may utilize this functionality to identify a start and end time of the selection to be made.

Figure 5:
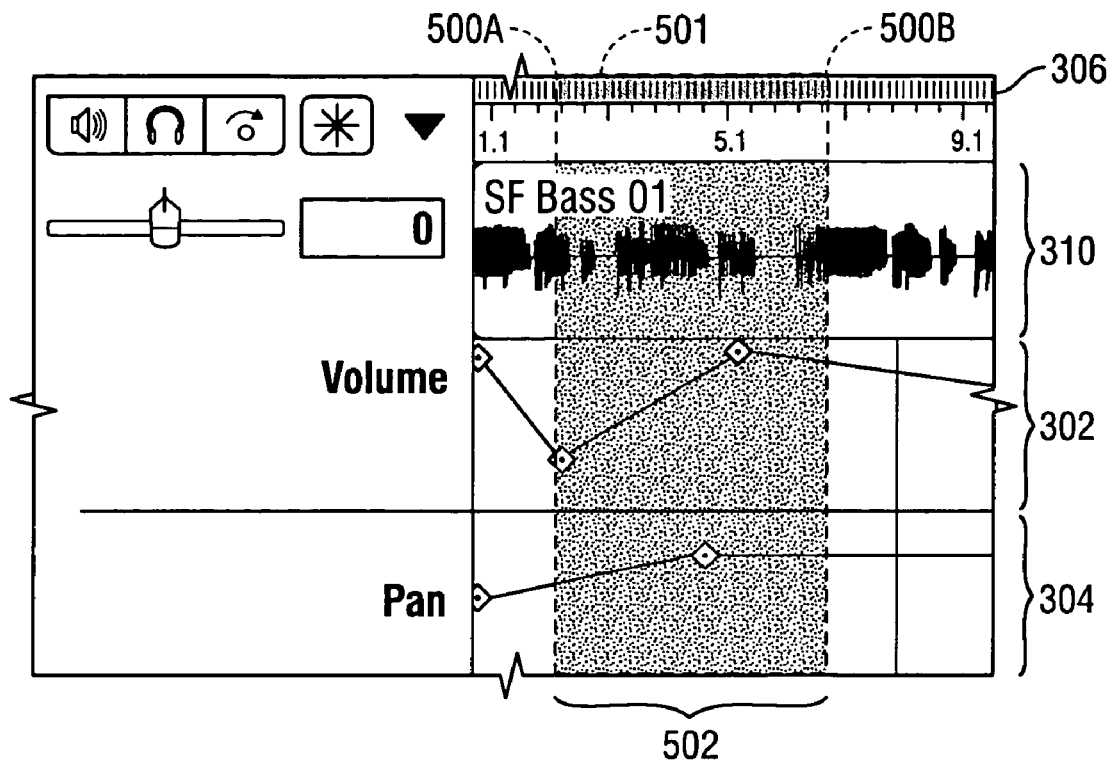
FIG. 5 is an illustration of a selection overlay indicating an area of an audio file selected by the user for manipulation via a timeline-based selection process in accordance with an embodiment of the invention.

FIG. 5 shows an example of an interface configured to implement the timeline-based selection mechanism of an embodiment of the present invention. To generate selection overlay 502, a user may indicate the start and end points to be associated with the selection overlay by directing an input device to a specific region or regions of timeline component 306. If, for example, the user wants to start a selection at region 500A and end the selection at region 500B, the user could instruct the system to generate selection overlay 502 between these two regions by moving a pointing device to region 500A, selecting that region, and then dragging the pointing device to region 500B, ending the selection there.

Alternatively the user may opt to have the system generate a selection overlay associated with the entire duration of an audio file by double-clicking or otherwise selecting timeline component 306 at a single point. Although the start and end points of selection overlay 502 are identified via an input device (e.g. a pointing device), the invention also contemplates the use of other user based input modes. For instance, the user may identify the start and end points using any input device to define the time point where selection overlay 502 is to begin and end. In another instance, the system is configured to automatically identify the bounds of selection overlay 502 based on user inputs associated with timeline component 306. This automatic process can optionally make use of audio analysis to assist the user with identifying an optimal start and end point. The system may, for instance, assist the user with making selections that do not cut the audio file in the midst of an attack, a key beat or crescendo.

Using timeline component 306 as the basis for the point of selection enables the user to assess the duration of time associated with the selection that is made. Because the interface also depicts an associated waveform component and zero or more parameter components, the user is also able to quickly determine the audio characteristics of the area being selected. Referring to FIG. 5, for instance, by quickly glancing at the parameter component associated with volume, the user can determine that the volume at the selected area starts at a lower level than at the end. The user can also discern from looking at waveform component 310, that the selected area of the audio file has a series of beats that vary in duration with intervening periods of silence. The user can then make a determination as to what time during payback is best to start or end the selection. In the example illustrated in FIG. 5, the user elected by selecting point 500A to begin in the middle of a beat and by selecting point 500B to end in a similar manner. If such an effect were not desired the user could alternatively select a point on the timeline that corresponds with the period of time between beats (e.g., point 501). Thus, the interface configured in accordance with one or more embodiments of the invention provides users with a way to determine the characteristics of the area of the audio file and make an informed decision about what area to select.

If the visual cues depicted within the display region do not provide enough information about the characteristics of the audio file or if the user wishes to fine-tune the selection, the user may opt to listen to the selected area itself by selecting a playback button. Once the user is satisfied with the area selected, the user can perform additional special functions upon the selected area.

Other special functions associated with the timeline component include a copy or move function that enables users to duplicate or move a selected area of the audio file (e.g., the area associated with the selection overlay). For instance, the user can initiate a move command and thereby cause the system to move the audio data associated with the selection overlay from one part of the interface to another part of the interface. Other functions include a cut command that deletes the area of the audio file associated with the selection overlay and a copy operation that duplicates the selected area elsewhere in the interface. The user may also initiate special functions (e.g., duplicating the audio file and the corresponding set of parameters) by dragging the area of the waveform having an associated selection overlay from one region of the interface to another. When a duplicate or move function is initiated the system generates a new instance of the audio file based on the selection overlay. The new instance comprises a duplicate set of the data that falls within the bounds of the selection overlay. However, in instances where a move operation occurs the system may use the original data rather than create a duplicate.

Figure 6:
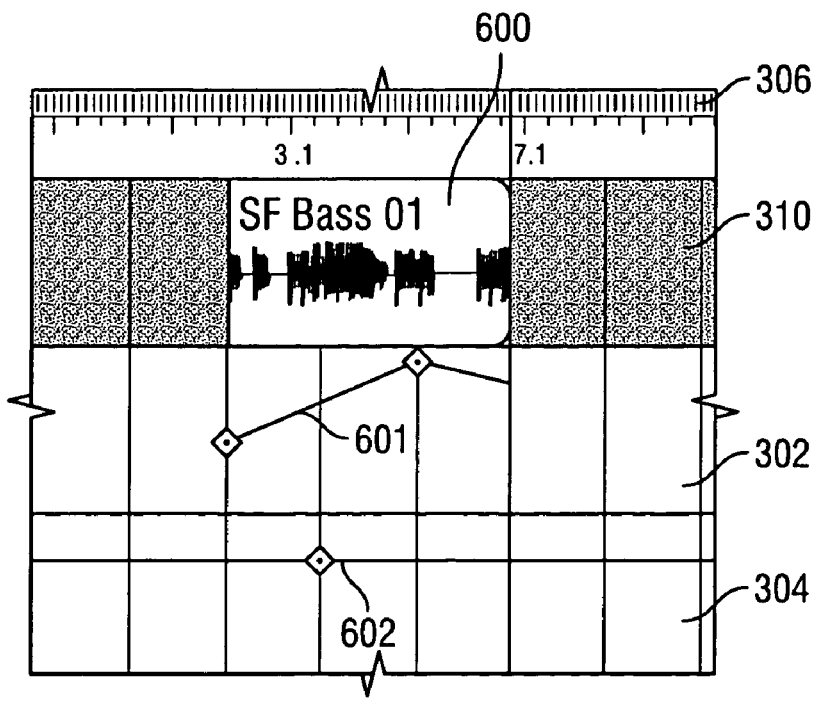
FIG. 6 is an illustration of a new instance of the area of the audio file associated with the selection overlay, in accordance with an embodiment of the invention.
Figure 7:
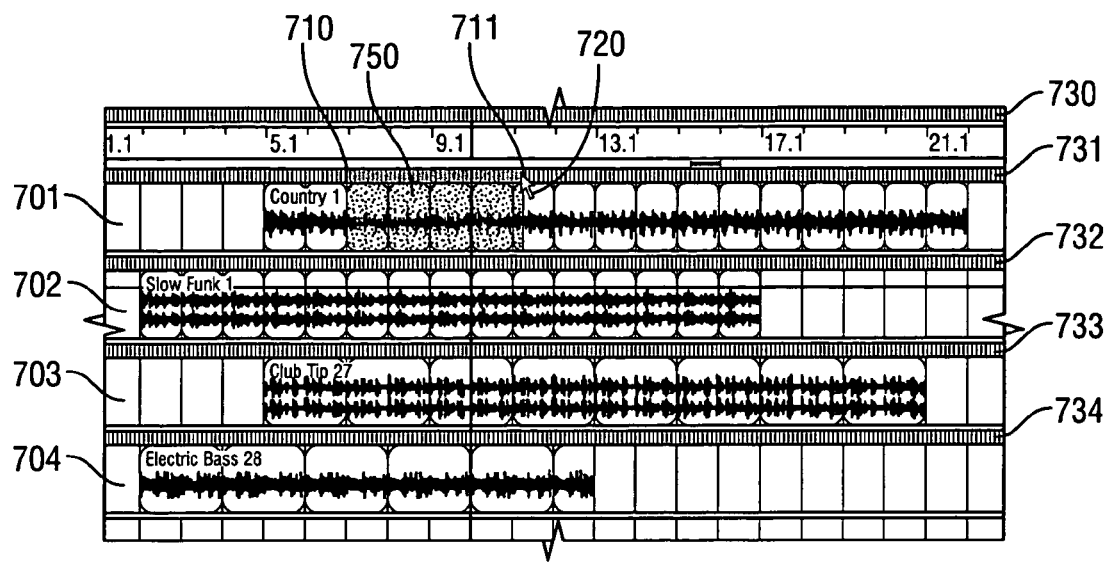
FIG. 7 is an illustration of timeline selection of a segment of an audio file from a plurality of audio files in accordance with an embodiment of the present invention.

FIG. 6 illustrates a duplicate 600 of selected area 502 as it would appear in a part of the editing region separate from the location of the original audio file. The selected area contains the adjusted parameters depicted in parameter components 302 and 304 as well as any other parameters associated with the file, but unadjusted by the user. The user can elect to adjust the parameters of the duplicated area without affecting the original from which the duplicate was derived. A user could, for example, modify parameter adjustment lines 601 and 602 without causing any impact upon the original audio file depicted in FIG. 5.

In one embodiment of the invention the area of playback that falls within the selection overlay can be applied to multiple audio display regions within the same playback period. Users can, for instance, perform this action by selecting the same range of time for multiple audio display regions. This may be accomplished in one embodiment by selecting the range of time in one audio display region and issuing a command (e.g., a keystroke combination or mouse input) to propagate the selection made in that area to another audio display region. Thus causing the same range of time to be selected in those audio display regions, and all of the special operations then apply to those audio display regions that include the selection region.

FIGS. 7-11 illustrate the selection function in accordance with and embodiment of the present invention. In these illustrations, timeline component (master selection bar) 730 may be associated with all the audio files in the editing region, e.g., 701, 702, 703, and 704; timeline component 731 may be associated with audio file 701; timeline component 732 may be associated with audio file 702; timeline component 733 may be associated with audio file 703; and timeline component 734 may be associated with audio file 704.

The selection function is integrated into the timeline component interface thus reducing the multiple selection steps of the prior art to a single step. For instance, in FIG. 7, the selection is accomplished when the user clicks and drags the pointer (e.g. mouse) 720 from timeline point 710 to timeline point 711 of timeline 731, which relates to audio track 701. The selected region 750 of audio track 701 is highlighted in this embodiment. Note that the colors and highlights used to depict the audio track and the selection may be accomplished with any combination of visual effects. For instance, the audio track may be depicted in color such as green, and the selected area may be depicted in light blue.

Figure 8:
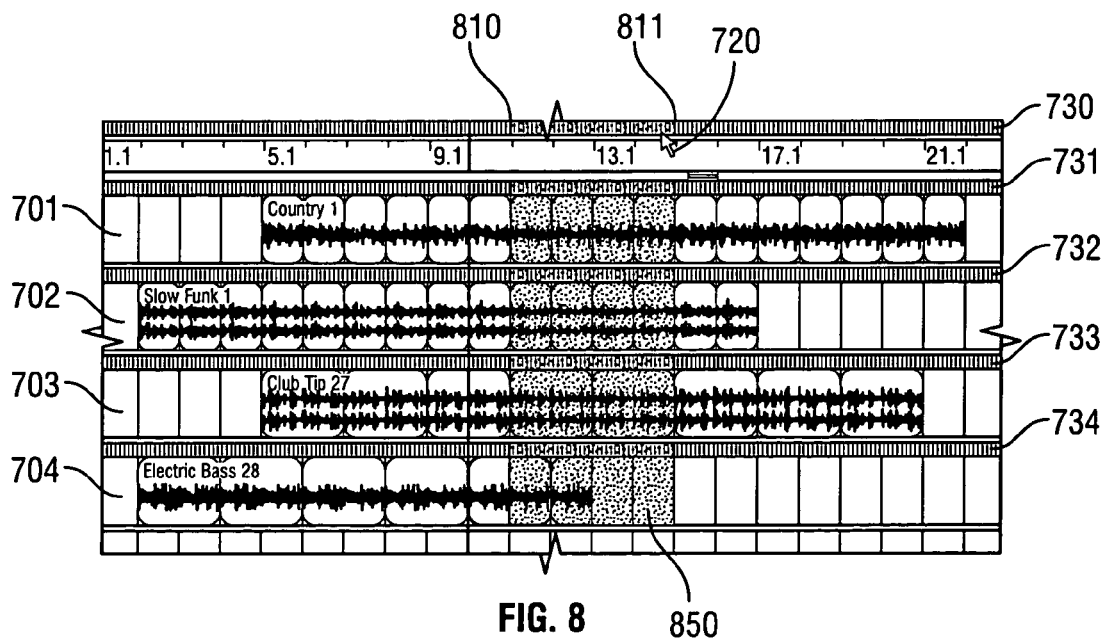
FIG. 8 is an illustration of timeline selection of a segment of a plurality of audio tracks in accordance with an embodiment of the present invention.

FIG. 8 is an illustration of selection of multiple audio tracks in accordance with an embodiment of the present invention. In this illustration, region 850, which comprises all the audio tracks in the display region, e.g., audio tracks 701, 702, 703, and 704, may be selected using the master selection bar 730. This may be accomplished by click and dragging pointer 720 from timeline point 810 to timeline point 811 of the master selection bar 730. As illustrated, the selected area includes all the audio tracks in the display region.

Figure 9:
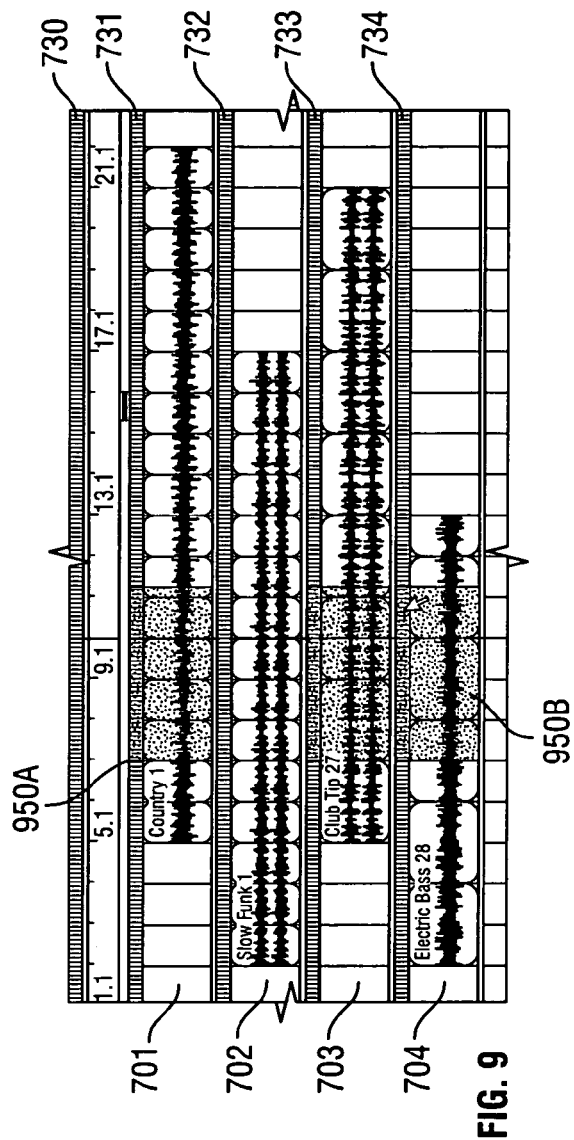
FIG. 9 is an illustration of discontinuous selection of multiple audio tracks in accordance with an embodiment of the present invention.

FIG. 9 is an illustration of discontinuous selection of multiple audio tracks in accordance with an embodiment of the present invention. As illustrated, region 950A comprising audio track 701 and region 950B comprising audio tracks 703 and 704 may be selected using an addition key, such as the Command key in Apple computers, or the Control key in personal computers, or any other key that performs the desired function (collectively called the Command key). To accomplish the selection, the user first makes a desired selection on any of the selection bars 730, 731, 732, 733, or 734. The user then holds the Command key down while clicking on the other tracks. For instance, the user may use selection bar 730 to select all the tracks 701-704, and then while holding the Command key the user may click on tracks that are not needed in the selection, for example, track 702, as illustrated in FIG. 9.

The selection of regions 950A and 950B may also be accomplished by first selecting region 703 by clicking and dragging on timeline selection bar 733, then while holding down the Command key, clicking on tracks 701 and 704. Note that the above illustrations are not exhaustive of how selection may be accomplished. In actual practice, there are several ways to accomplish the desired selection, which cannot all be described herein.

Figure 10:
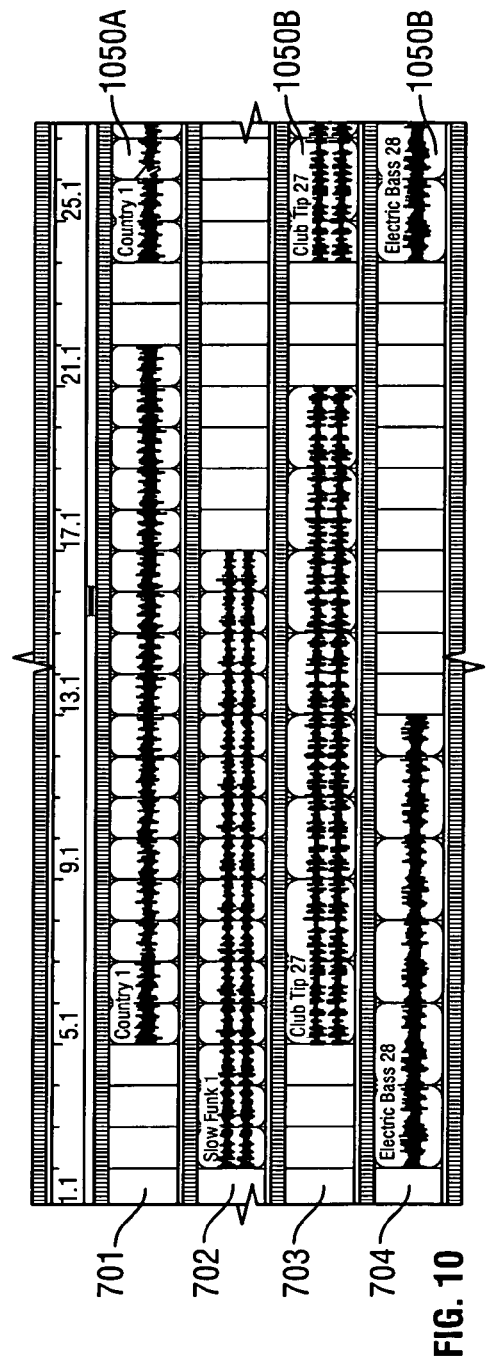
FIG. 10 is an illustration of the pasting function in accordance with an embodiment of the present invention.

FIG. 10 is an illustration of the pasting function in accordance with an embodiment of the present invention. For instance, the selected regions 950A and 950B may be pasted into regions 1050A and 1050B as shown in FIG. 10. This could be accomplished by clicking and dragging the selected region (e.g. by holding down the Command key) to the desired new location.

D. Method for Implementing Timeline Based Audio File Selection

Figure 11:
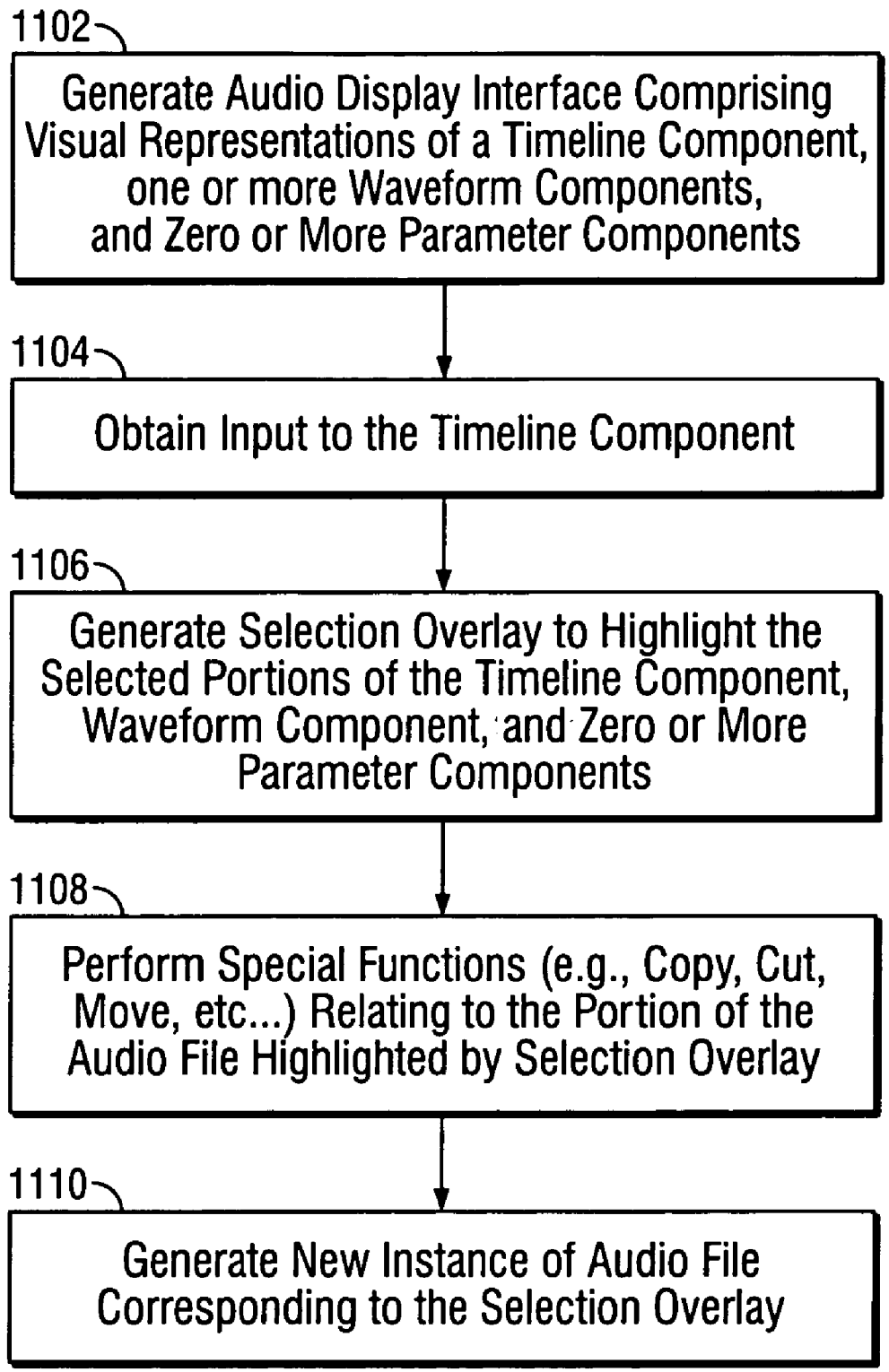
FIG. 11 is a flow chart illustrating the process for implementing timeline-based selection and duplication or manipulation of an audio file segment.

A stepwise walkthrough of the process selection and pasting is depicted in FIG. 11. The process initiates when the system (e.g., computer software or hardware) generates an interface containing visual representations of a timeline component, one or more waveform components, and zero or more parameter components (e.g., step 1102). When the user utilizes an input device to identify a start and end point on the timeline component, the system obtains the user's selection (e.g., step 1104) and uses that information to generate a selection overlay (e.g., step 1106). In one embodiment of the invention, the selection overlay is translucent although the system may also generate opaque or other types of selection overlays. The purpose of the selection overlay is to visually represent the area of the audio file the user can perform special functions upon (e.g., step 1108). For instance, the user may cause the system to generate a duplicate of the selection area of the audio file and that area's corresponding parameters by copying the area represented by the selection overlay from one area of the interface to another. For instance, if the user wanted to repeat the same segments back-to-back the user may do so by dragging a selection overlay to a point along the timeline component that falls subsequent to the first instance of the audio file. Once the selection is moved, or copied, and the system creates another instance of the part of the audio file associated with the selection overlay, the user is free to modify the parameters and other characteristics associated with the newly created instance (e.g., step 1110). Modifications made to the new instance are independent of any changes made to the original file from which the instance was derived. Thus, changes to the copy do not necessarily affect the original. It is, however, within the scope of the invention for the original and the copy to have a tightly coupled relationship so that modifications to the copy affect the original and vise-versa.

Thus a graphical user interface for providing timeline-based selection of an audio file segment has been described. The claims, however, and the full scope of any equivalents are what define the invention.

The invention claimed is:

1. A method for manipulating at least one audio file via a graphical user interface, the method comprising the steps of:
   displaying a timeline component having a set of time points indicative of a duration of an audio file, the audio file comprising a plurality of audio tracks;
   displaying a separate waveform component for each of the plurality of audio tracks, each waveform component having graphic elements that visually represent characteristics of an audio track of the plurality of audio tracks over said duration;
   wherein the timeline component and each waveform component are concurrently displayed on the graphical user interface;
   obtaining first input to said timeline component where said first input identifies a first time point and a second time point of said set of time points, and wherein the first time point and the second time point are identified by a user utilizing an input device to select, within said timeline component, the first time point and the second time point, wherein said first input includes selection of the first time point and dragging from the first time point to the second time point;
   in response to obtaining said first input, generating an initial selection overlay comprising an area of said timeline component and each waveform component, wherein said area starts at said first time point and ends at said second time point;
   obtaining second input, wherein the second input involves dragging said area to a region within the graphical user interface;
   in response to obtaining said second input, performing an operation involving just the portion of the audio file that corresponds to the area, wherein the operation is performed without obtaining input to a tool selection component between obtaining said first input and obtaining said second input;
   wherein the method for manipulating at least one audio file is performed by a computing device programmed to be a special purpose machine pursuant to instructions from program software.

2. The method of claim 1, wherein said characteristics of said audio file is amplitude.

3. The method of claim 1, wherein said area of said selection overlay is highlighted.

4. The method of claim 1, wherein said set of time points represents intervals of time.

5. The method of claim 1 further comprising:
   generating a visual representation on said timeline component and said waveform component upon receiving said first input to said timeline component.

6. The method of claim 5, wherein said visual representation indicates a start point of said selection overlay.

7. The method of claim 5, wherein said visual representation indicates an end point of said selection overlay.

8. The method of claim 1 wherein said operation is a copy operation that creates a duplicate of said area within the graphical user interface.

9. The method of claim 1, wherein said operation is a move operation that moves said area from one region within said graphical user interface to another region within the graphical user interface.

10. The method of claim 1, wherein said operation is a cut operation that deletes said area from the graphical user interface.

11. The method of claim 8, wherein said copy operation creates a duplicate of said portion of the audio file that corresponds to said area.

12. A computer-readable storage medium storing computer readable program code for manipulating at least one audio file via a graphical user interface, said computer readable program code comprising computer program code configured to cause a computer to:

display a timeline component having a set of time points indicative of a duration of an audio file, the audio file comprising a plurality of audio tracks;

display a separate waveform component for each of the plurality of audio tracks, each waveform component having graphic elements that visually represent characteristics of an audio track of the plurality of audio tracks over said duration;

wherein the timeline component and each waveform component are concurrently displayed on the graphical user interface;

obtain first input to said timeline component wherein said first input identifies a first time point and a second time point of said set of time points, and wherein the first time point and the second time point are identified by a user utilizing an input device to select, within said timeline component, the first time point and the second time point, wherein said first input includes selection of the first time point and dragging from the first time point to the second time point;

in response to obtaining said first input, generate an initial selection overlay comprising an area of said timeline component and each waveform component, wherein said area starts at said first time point and ends at said second time point;

obtain second input, wherein the second input involves dragging said area to a region within the graphical user interface;

in response to obtaining said second input, perform an operation involving just the portion of the audio file that corresponds to the area, wherein the operation is performed without obtaining input to a tool selection component between obtaining said first input and obtaining said second input.

13. The computer-readable storage medium of claim 12, wherein said computer program code configured to cause said computer to display said waveform component further comprises computer program code configured to cause said computer to display a data amplitude of said at least one audio file.

14. The computer-readable storage medium of claim 12, wherein said computer program code configured to cause said computer to generate said selection overlay further comprises computer program code configured to cause said computer to highlight said selection overlay.

15. The computer-readable storage medium of claim 12, wherein said computer program code configured to cause said computer to obtain input to said timeline component further comprises computer program code configured to cause said computer to represent intervals of time.

16. The computer-readable storage medium of claim 12 further comprising computer program code configured to cause said computer to generate a visual representation of said timeline component and said waveform component upon receiving said first input to said timeline component.

17. The computer-readable storage medium of claim 16, wherein said computer program code configured to cause said computer to display said waveform component further comprises computer program code configured to cause said computer to indicate a start point of said selection overlay.

18. The computer-readable storage medium of claim 16, wherein said computer program code configured to cause said computer to display said waveform further comprises computer program code configured to cause said computer to indicate an end point of said selection overlay.

19. The computer-readable storage medium of claim 12, wherein said operation is a copy operation that creates a duplicate of said area within the graphical user interface.

20. The computer-readable storage medium of claim 12, wherein said operation is a move operation that moves said area from one region within said graphical user interface to another region within the graphical user interface.

21. The computer-readable storage medium of claim 12, wherein said operation is a cut operation that deletes said area from the graphical user interface.

22. The computer-readable storage medium of claim 12, wherein said copy operation creates a duplicate of said portion of the audio file that corresponds to said area.

* * * * *

UNITED STATES PATENT AND TRADEMARK OFFICE
CERTIFICATE OF CORRECTION

PATENT NO.       : 7,653,550 B2                                              Page 1 of 1
APPLICATION NO. : 10/816121
DATED            : January 26, 2010
INVENTOR(S)      : Egan Schulz It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 936 days.

Signed and Sealed this

Twenty-third Day of November, 2010

David J. Kappos
*Director of the United States Patent and Trademark Office*